US010219496B2

(12) United States Patent
Gierlich

(10) Patent No.: US 10,219,496 B2
(45) Date of Patent: Mar. 5, 2019

(54) FISHING JIG

(71) Applicant: Chad Gierlich, San Diego, CA (US)

(72) Inventor: Chad Gierlich, San Diego, CA (US)

(73) Assignee: Hookup Baits, Inc., San Diego, CA (US)

( * ) Notice: Subject to any disclaimer, the term of this patent is extended or adjusted under 35 U.S.C. 154(b) by 320 days.

(21) Appl. No.: 15/058,051

(22) Filed: Mar. 1, 2016

(65) Prior Publication Data
US 2017/0251650 A1 Sep. 7, 2017

(51) Int. Cl.
| | |
|---|---|
| A01K 85/02 | (2006.01) |
| A01K 85/00 | (2006.01) |
| A01K 99/00 | (2006.01) |
| B29C 41/14 | (2006.01) |
| B29C 41/42 | (2006.01) |
| B29C 69/00 | (2006.01) |
| B22D 25/02 | (2006.01) |
| B22D 21/00 | (2006.01) |
| B29K 705/04 | (2006.01) |
| B29L 31/00 | (2006.01) |

(52) U.S. Cl.
CPC .............. *A01K 85/02* (2013.01); *A01K 99/00* (2013.01); *B22D 21/007* (2013.01); *B22D 25/02* (2013.01); *B29C 41/14* (2013.01); *B29C 41/42* (2013.01); *B29C 69/001* (2013.01); *B29K 2705/04* (2013.01); *B29K 2995/0026* (2013.01); *B29L 2031/7002* (2013.01)

(58) Field of Classification Search
CPC ........ A01K 85/02; A01K 85/00; A01K 85/16; A01K 85/18; A01K 99/00; B29L 2031/7002; A63H 23/00; A63H 23/005; A63H 23/10; A63H 3/26
See application file for complete search history.

(56) References Cited

U.S. PATENT DOCUMENTS

| | | | | |
|---|---|---|---|---|
| 1,264,627 A | | 4/1918 | Foss | |
| 1,600,652 A | * | 9/1926 | Steenstrup | A01K 85/16 43/42.09 |
| 2,242,726 A | * | 5/1941 | Leusch | A01K 85/16 43/42.35 |
| 2,500,451 A | * | 3/1950 | Codd | A01K 83/06 43/41 |
| 2,582,646 A | * | 1/1952 | Moore | A01K 83/06 43/41 |

(Continued)

FOREIGN PATENT DOCUMENTS

JP  2002354964 A  * 12/2002

*Primary Examiner* — Kathleen I Alker
(74) *Attorney, Agent, or Firm* — Knobbe Martens Olson & Bear LLP

(57) ABSTRACT

A fishing jig is disclosed. The fishing jig includes a semi-transparent skirt having a generally tubular body that extends between a closed head end and a tail end that includes an opening. A channel is formed within the tubular body and extends from the opening toward the head end. The fishing jig also includes a jig head positioned within the channel of the skirt and at least partially visible through the skirt. The jig head may include a body having a first side and a second side, an eye positioned on each of the first side and the second side, the eyes being visible through the skirt, and a hook that extends from the body and through the opening in the skirt. The fishing jig may mimic the look and motion of bait fish.

12 Claims, 20 Drawing Sheets

(56) References Cited

U.S. PATENT DOCUMENTS

| | | | | |
|---|---|---|---|---|
| 2,590,461 A * | 3/1952 | Rasch | A01K 85/02 | 43/42.1 |
| 2,708,806 A * | 5/1955 | Siebert | A01K 85/14 | 43/42.33 |
| 2,731,755 A * | 1/1956 | Ward | A01K 85/16 | 43/42.06 |
| 2,762,156 A * | 9/1956 | Takeshita | A01K 85/16 | 43/42.23 |
| 2,781,604 A | 2/1957 | Brown | | |
| 2,944,363 A * | 7/1960 | Poe | A01K 85/16 | 43/42.22 |
| 2,996,826 A * | 8/1961 | Lamar | A01K 85/16 | 43/42.09 |
| 3,041,772 A * | 7/1962 | Laszlo | A01K 85/16 | 43/42.06 |
| 3,418,745 A * | 12/1968 | Loos | A01K 85/16 | 43/42.09 |
| 3,483,651 A * | 12/1969 | Borger | A01K 85/16 | 43/42.36 |
| 4,429,482 A * | 2/1984 | Honse | A01K 85/00 | 43/42.32 |
| 4,790,100 A * | 12/1988 | Green, Sr. | A01K 85/00 | 43/42.26 |
| 4,887,377 A * | 12/1989 | Morris | A01K 85/00 | 43/42.24 |
| 4,922,646 A * | 5/1990 | Basgal | A01K 85/00 | 43/42.33 |
| 5,134,801 A * | 8/1992 | Davey | A01K 83/06 | 43/42.06 |
| 5,299,378 A * | 4/1994 | Ballard | A01K 85/00 | 43/42.06 |
| 5,301,453 A * | 4/1994 | Terrill | A01K 85/00 | 43/42.09 |
| 5,396,728 A | 3/1995 | Weber | | |
| 5,428,918 A * | 7/1995 | Garrison | A01K 85/00 | 43/42.24 |
| 5,806,234 A * | 9/1998 | Nichols | A01K 85/00 | 43/42.37 |
| D405,497 S | 2/1999 | Phelps | | |
| 5,918,405 A * | 7/1999 | Marusak | A01K 85/16 | 43/42.09 |
| 5,926,993 A * | 7/1999 | Marusak | A01K 85/16 | 43/42.09 |
| 6,032,400 A * | 3/2000 | Lau | A01K 85/00 | 43/42 |
| 6,233,863 B1 * | 5/2001 | Dotson | A01K 85/00 | 43/42.09 |
| D452,291 S | 12/2001 | Puccio | | |
| 6,606,815 B1 * | 8/2003 | Toris | A01K 85/14 | 43/42.09 |
| 7,076,911 B2 * | 7/2006 | Thorne | A01K 85/00 | 43/42.26 |
| 7,216,455 B2 * | 5/2007 | Becker | A01K 85/01 | 43/42.37 |
| 7,694,453 B1 * | 4/2010 | Arrico | A01K 85/02 | 43/42.06 |
| 7,748,157 B1 | 7/2010 | Hellmann | | |
| D667,921 S | 9/2012 | Erbeck | | |
| 8,533,990 B2 * | 9/2013 | Aanenson | A01K 85/01 | 43/17.6 |
| 8,667,728 B2 * | 3/2014 | Ware | A01K 85/01 | 43/17.6 |
| 9,010,015 B2 * | 4/2015 | Lorentz | A01K 85/00 | 43/42.39 |
| 9,445,583 B1 * | 9/2016 | Aanenson | A01K 85/00 | |
| 9,615,553 B2 * | 4/2017 | Coniglio | A01K 85/16 | |
| D815,245 S | 4/2018 | Robinson | | |
| 2002/0073606 A1 * | 6/2002 | Mameamskum | A01K 85/14 | 43/42.5 |
| 2006/0010764 A1 * | 1/2006 | Frawley | A01K 85/16 | 43/42.09 |
| 2009/0056196 A1 * | 3/2009 | Korteweg | A01K 85/00 | 43/42.39 |
| 2012/0023804 A1 * | 2/2012 | Hogan | A01K 85/00 | 43/42.39 |
| 2015/0250154 A1 * | 9/2015 | Hamaguchi | A01K 85/00 | 43/42.1 |
| 2016/0050898 A1 * | 2/2016 | Walter | A01K 85/16 | 43/17.6 |
| 2016/0157472 A1 * | 6/2016 | Neal | A01K 83/06 | 43/41 |

\* cited by examiner

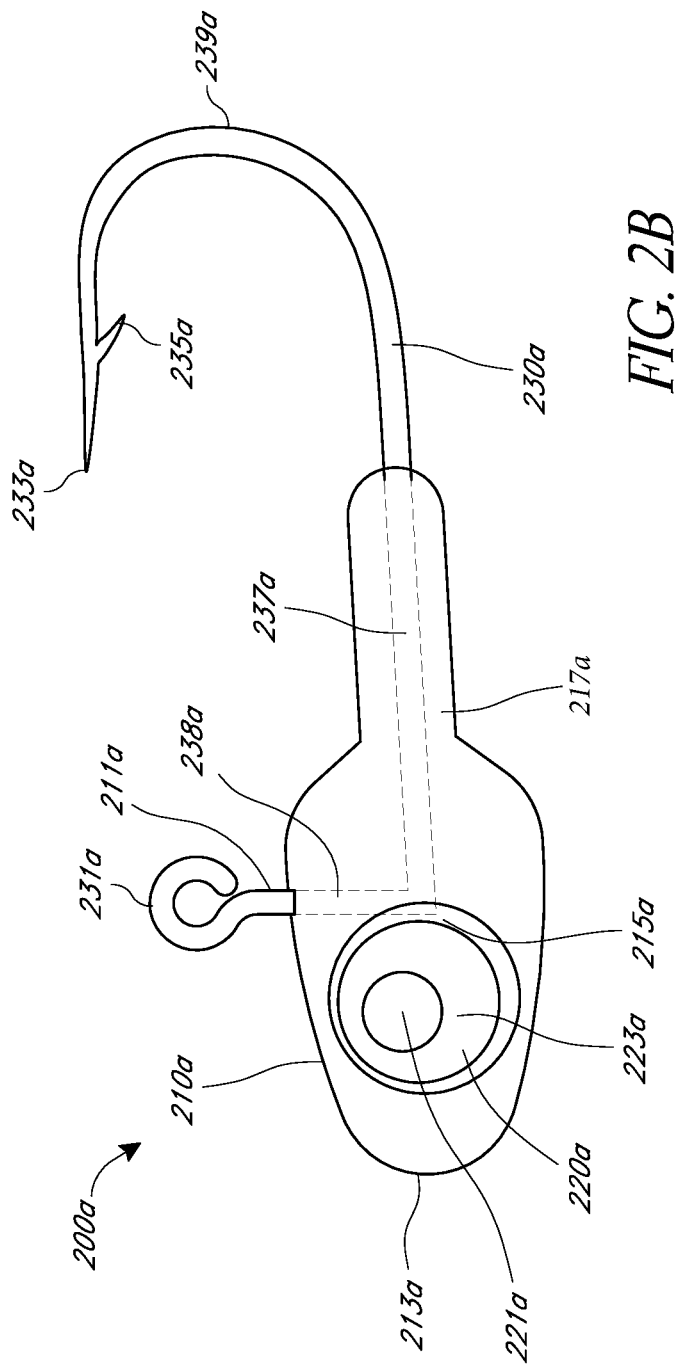

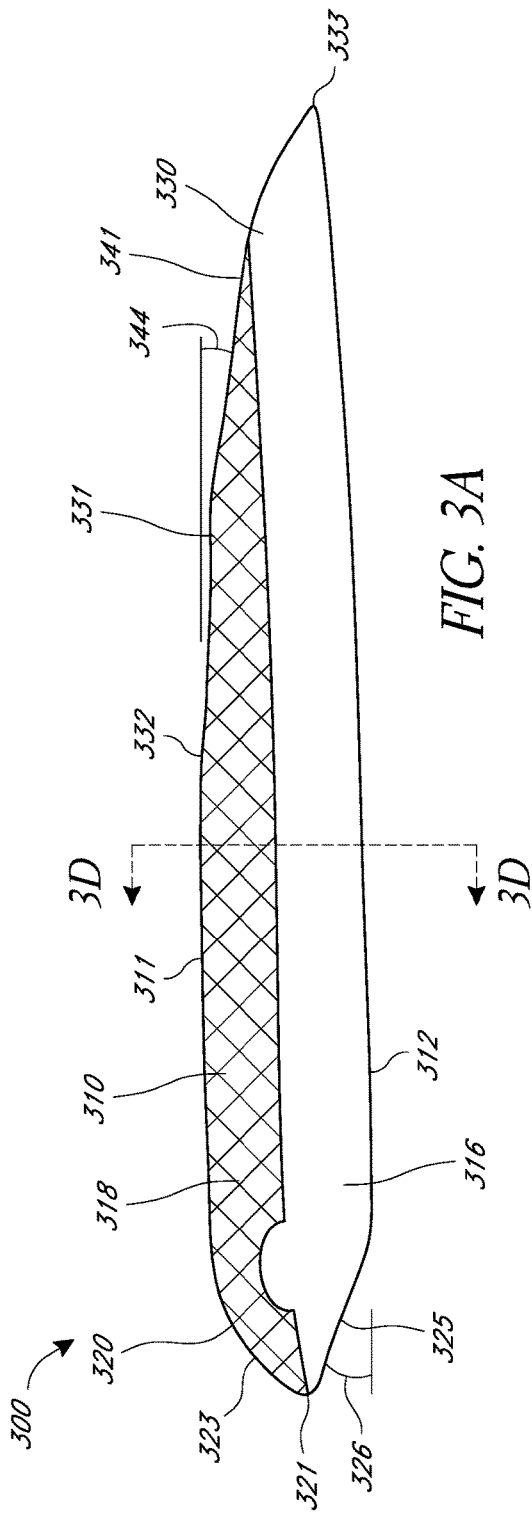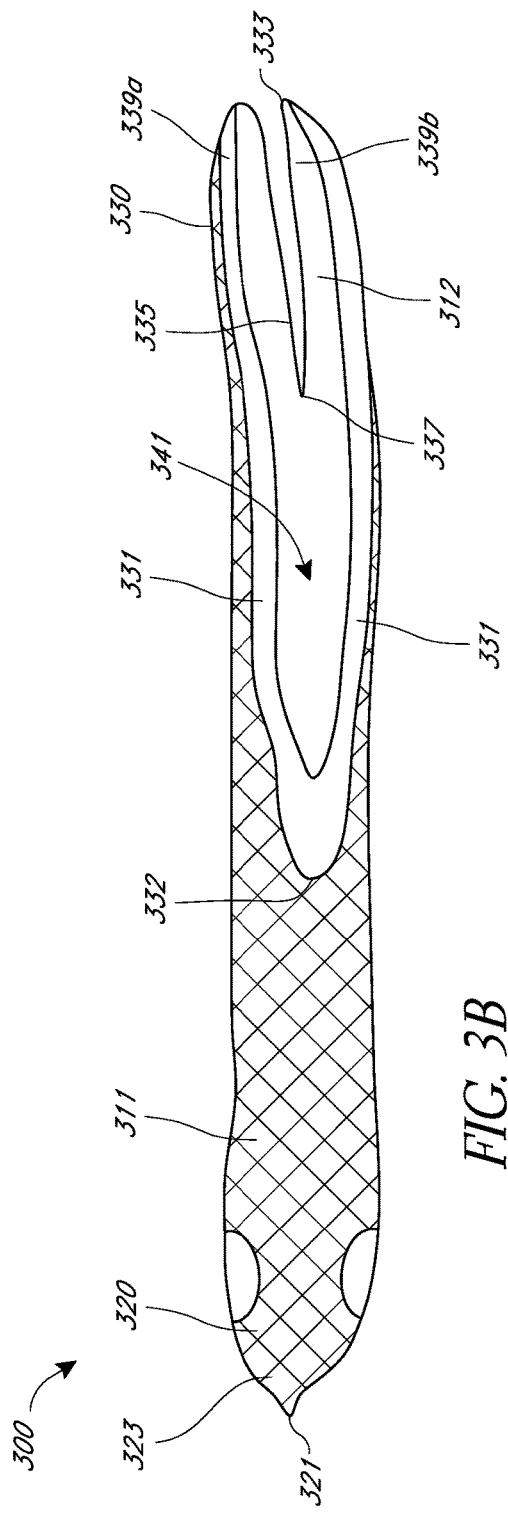

FISHING JIG

BACKGROUND

This disclosure relates to fishing lures. In particular, this disclosure describes a jig that mimics the look and motion of bait fish.

Fishing with jigs, otherwise known as jigging, is common. In general, jigs are artificial lures that are designed to produce a darting, jerky motion when drawn through the water. The motion of the jig attracts fish. Jigs can be jigged vertically, cast and retrieved, or trolled, and can be effective for attracting a wide variety of fish in both fresh and salt water. Many efforts have been made to improve the effectiveness of jigs. In general these improvements relate to improving the motion of the jig and/or improving the look of the jig. A jig that mimics the look and action of a live bait fish may be desirable.

SUMMARY

In a first aspect, a fishing jig is disclosed. The jig includes a semitransparent skirt having a generally tubular body that extends along a longitudinal axis between a closed head end and a tail end that includes an opening, and a channel formed within the tubular body that extends along the longitudinal axis from the opening through the tubular body at least partway toward the head end. The jig also includes a jig head positioned within the channel and proximal to the head end. The jig head includes a body having a first side and a second side, an eye positioned on each of the first side and the second side, the eyes being visible through the skirt, and a hook that extends from the body and through the opening in the skirt.

In some embodiments, the tail end includes a taper that tapers from a taper start point on the top of the tubular body to a tip, the tip located at the intersection of the taper and the bottom of the tubular body. The tail end may also include a slit that divides the rearmost portion of the tail end into two split tail portions, the slit extending from the tip along the bottom of the tubular body. In some embodiments, the slit extends from the tip to a slit stop point, and the slit stop point is positioned in a plane normal to the longitudinal axis that is between a plane normal to the longitudinal axis containing the tip and a plane normal to the longitudinal axis containing the taper start point. The taper start point may be positioned on the top of the tubular body at approximately the midpoint of the skirt measured along a length of the skirt. The slit may extend from the tip to a slit stop point, and the slit stop point may be located at approximately the midpoint between the taper start point and the tip, measured along the length of the skirt. In some embodiments, the body of the jig head includes patterning formed thereon that mimics the appearance of a bait fish, and the patterning may be visible through the skirt. In some embodiments, the patterning may include scales. In some embodiments, the body of the jig head is coated with an ultraviolet reflective coating. In some embodiments, the head end of the skirt may include a pointed nose, and the pointed nose may be at least partially formed by an angled, substantially flat portion that extends from a tip of the pointed nose toward the bottom of the tubular body of the skirt and a convex curved surface that extends from the top of the tubular body of the skirt to the tip of the pointed nose. The pointed nose may point slightly downward with respect to a longitudinal axis of the skirt.

In another aspect, a fishing jig system is disclosed. The system includes a semitransparent skirt. The skirt may have a generally tubular body that extends along a longitudinal axis between a closed head end and a tail end that includes an opening, and a channel formed within the tubular body that extends along the longitudinal axis from the opening through the tubular body at least partway toward the head end. The skirt is configured to receive a jig head including eyes within the channel such that the eyes are visible through the semitransparent skirt. In some embodiments, the tail end includes a taper that tapers from a taper start point on the top of the tubular body to a tip, the tip located at the intersection of the taper and the bottom of the tubular body. In some embodiments, the tail end of the tubular body further comprises a slit that divides the rearmost portion of the tail end into two split tail portions, the slit extending from the tip along the bottom of the tubular body. In some embodiments, the head end of the skirt further comprises a pointed nose, and wherein the pointed nose is at least partially formed by an angled, substantially flat portion that extends from a tip of the pointed nose toward the bottom of the tubular body of the skirt and a convex curved surface that extends from the top of the tubular body of the skirt to the tip of the pointed nose.

The system may also include a jig head. The jig head may include a body having a first side and a second side, an eye positioned on each of the first side and the second side, and a hook that extends from the body. The body may include patterning that mimics the appearance of a bait fish and/or may be coated with an ultraviolet reflective coating.

In another aspect a method of manufacturing a fishing jig is disclosed. The method includes forming a skirt for a fishing jig by warming a soft plastic material to a viscous consistency; dipping a rod into the soft plastic material and removing the rod to create a layer of the soft plastic material on the rod to form a tubular body and a channel within the tubular body, the tubular body being at least semitransparent, the channel extending from an opening in a tail end of the tubular body toward a head end of the tubular body; removing the tubular body from the rod; cutting the tubular body at an angle to taper a tail end; and cutting a slit in the tail end to create two split tail portions. Forming the skirt may further include angling the rod to create a downward pointing drip trail, and cutting the drip tail at an angle to create a pointed nose on the tubular body.

The method may also include forming a jig head by positioning a hook in a mold; casting a body around the hook by adding molten metal to the mold; removing the body from the mold; applying an eye on each side of the body; and applying an ultraviolet coating to the body.

The method may also include inserting a jig head into the channel in the skirt such that the body is positioned proximal to the head end of the skirt and the hook extends out the opening of the skirt, the eyes of the jig head being visible through the skirt.

BRIEF DESCRIPTION OF THE DRAWINGS

The features and advantages of the fishing jigs described herein will become more fully apparent from the following description and appended claims, taken in conjunction with the accompanying drawings. These drawings depict only several embodiments in accordance with the disclosure and are not to be considered limiting of its scope. In the drawings, similar reference numbers or symbols typically identify similar components, unless context dictates otherwise. The drawings may not be drawn to scale.

FIG. 2B shows a side view of another embodiment of a jig head that can be used in the jig of FIG. 1A.

FIG. 3A shows a side view of the skirt of the jig of FIG. 1A.

FIG. 3B shows a top view of the skirt of FIG. 3A.

DETAILED DESCRIPTION

The following discussion presents detailed descriptions of several embodiments of fishing jigs as well as descriptions of their methods of manufacture. These embodiments are not intended to be limiting, and modifications, variations, combinations, etc., of the various features of these embodiments are possible and within the scope of this disclosure.

Figure 1A:
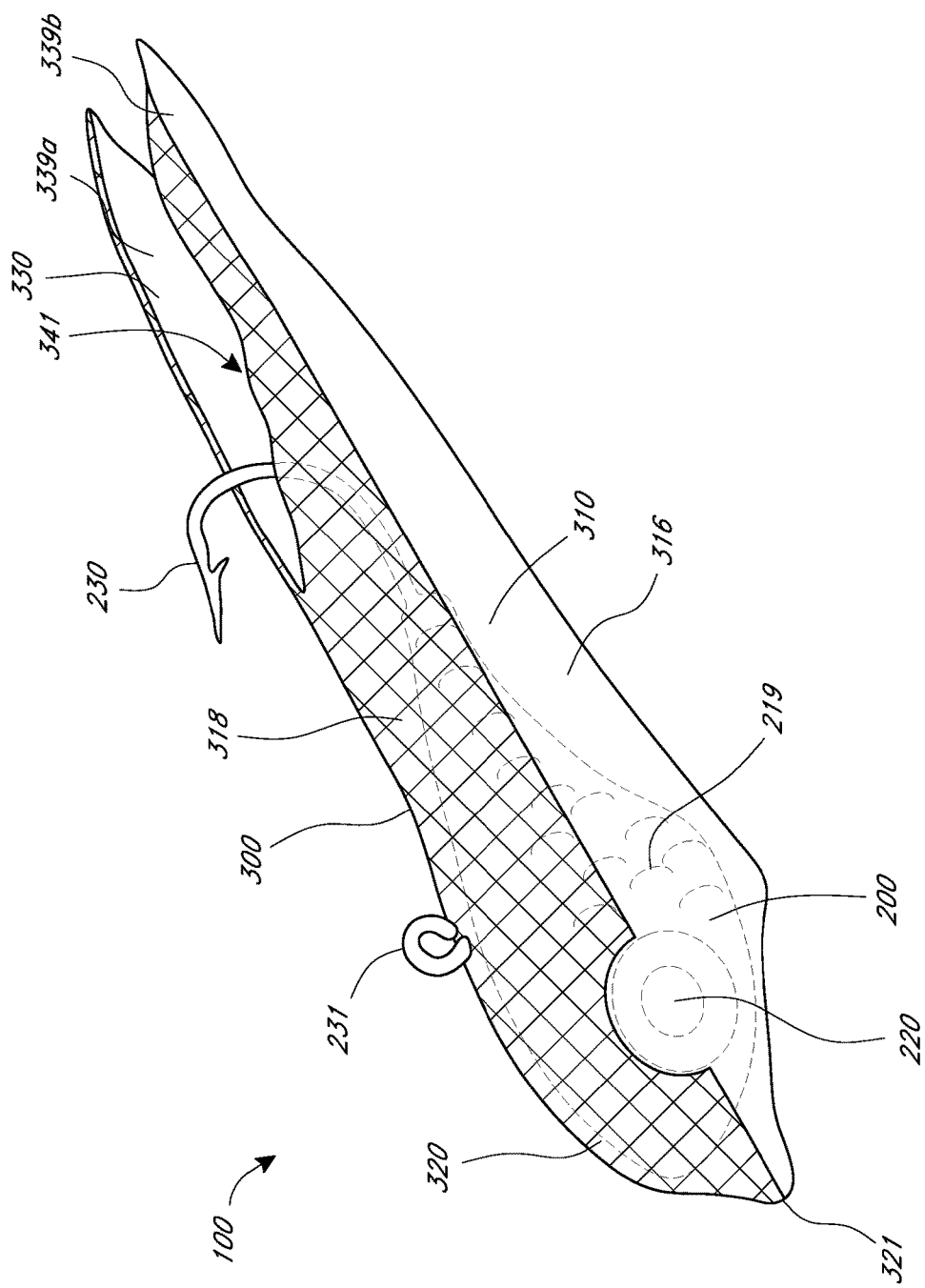
FIG. 1A shows a perspective view of an embodiment of a fishing jig of the present invention.
Figure 1B:
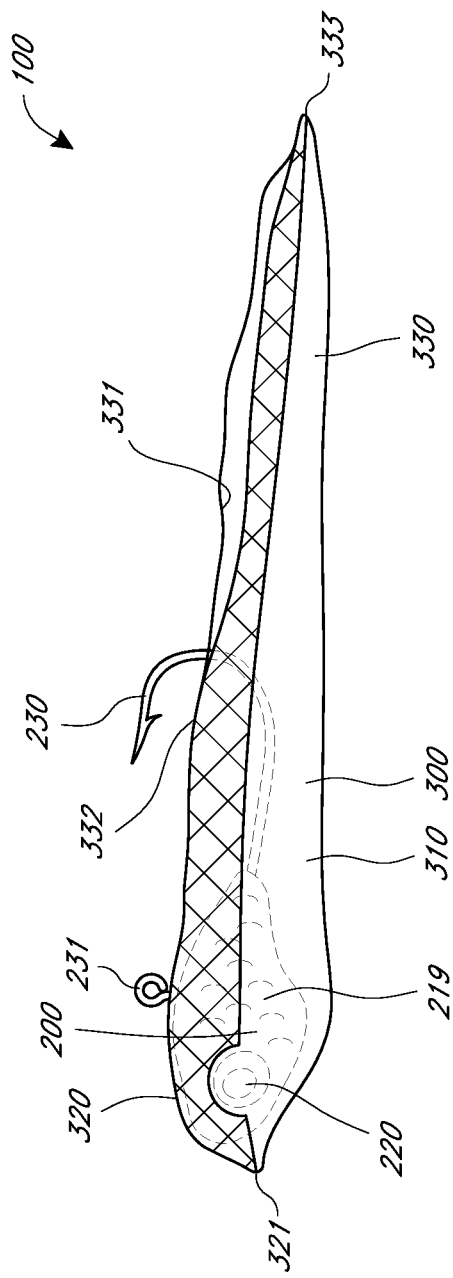
FIG. 1B is a side view of the jig of FIG. 1A.
Figure 1C:
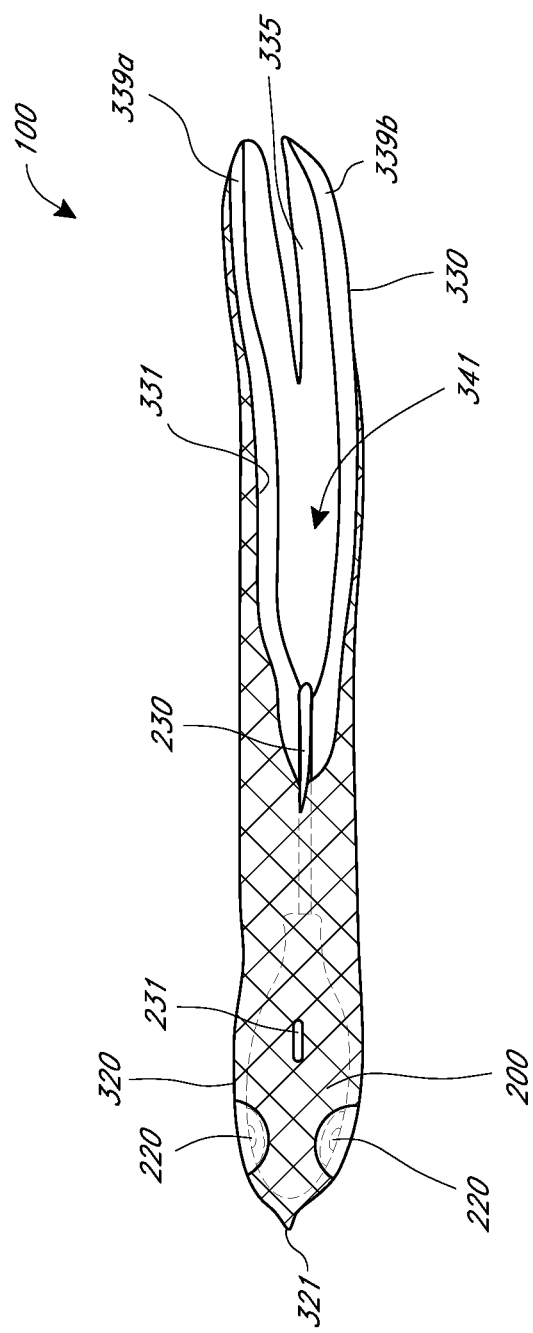
FIG. 1C is a top view of the jig of FIG. 1A.
Figure 1D:
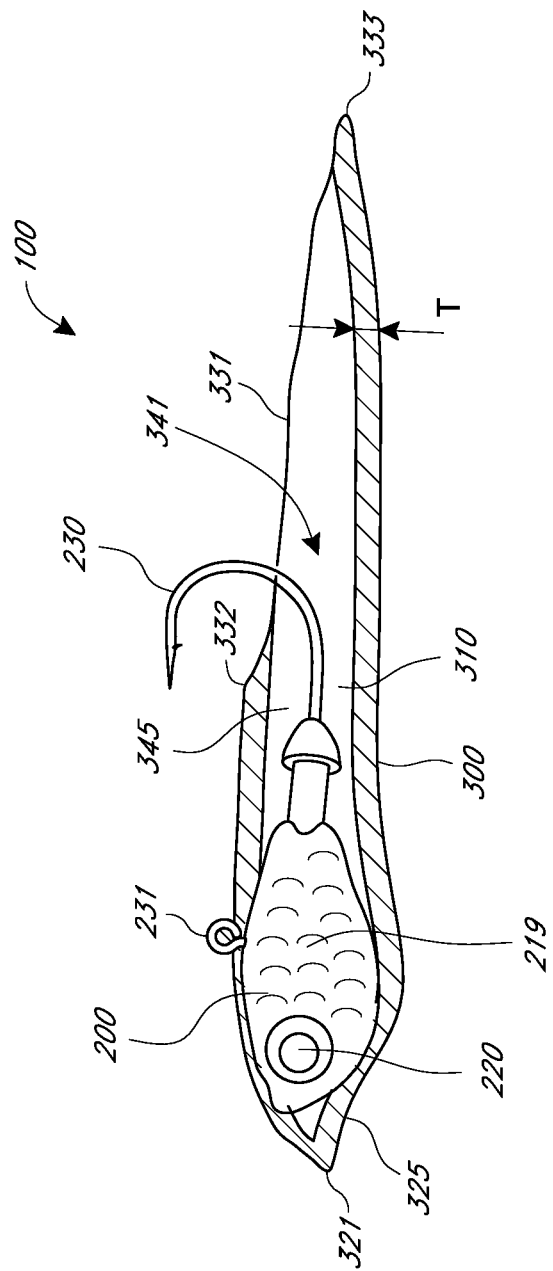
FIG. 1D is a side view of the jig of FIG. 1A, which depicts the jig with one side of the skirt removed to illustrate how the jig head is positioned within the skirt.

FIG. 1A shows a perspective view of an embodiment of a fishing jig 100. The jig 100 includes a jig head 200 positioned within a semitransparent soft plastic skirt 300. In general, the jig 100 is configured to provide a life like appearance that mimics the look and action of a live bait fish. FIG. 1B is a side view of the jig 100, and FIG. 1C is a top view of the jig 100. FIG. 1D is a side view of the jig 100 that depicts the jig 100 with one side of the skirt 300 removed so as to illustrate how the jig head 200 is positioned within the skirt 300.

As mentioned above, the jig 100 includes the jig head 200 and the skirt 300. The jig head 200 is described in greater detail below in reference to FIGS. 2A and 2B, and the skirt 300 is described in greater detail below in reference to FIGS. 3A-3D. In the assembled state, as shown in FIGS. 1A-1D, the jig head 200 is inserted into the skirt 300. The skirt 300 may be formed of a transparent or semitransparent soft plastic material such that the jig head 200 is at least partially visible through the skirt 300. For example, as shown in FIGS. 1A-1C, the outline of the jig head 200, eyes 220 positioned on the jig head 200, and a patterning 219 formed on the jig head 200 are all visible through the skirt 300. In FIGS. 1A-1C figures, this transparency or semitransparency has been illustrated the features of the jig head 200 that are visible through the skirt 300 using dashed lines.

While transparent or semitransparent, the skirt 300 may be tinted or colored to more closely resemble a bait fish. Various colors and combinations of colors are possible as described below. As illustrated in FIGS. 1A and 1B, an upper portion 318 may include a darker coloring and/or pattern than a lower portion 316. The upper portion 318 has been illustrated in the figures with cross-hatching. In some embodiments, the soft plastic material from which the skirt 300 is made may also include glitter or other flecks. In some embodiments, the soft plastic material may include a scent that attracts fish.

In the illustrated embodiment, the skirt 300 is shaped as a generally tubular body 310 extending between a pointed nose 321 on a head end 320 and a tail end 330 that includes an opening 341. The tail end 330 may include a taper 331 that narrows the body 310 to a tip 333. The tubular body 310 defines a channel 345 (see, for example, FIG. 1D) into which the jig head 200 is inserted. As best seen in FIG. 1D, the jig head 200 is positioned within the channel 345 proximal to the pointed nose 321 and/or head end 320 of skirt 300. In some embodiments, the jig head 200 may cause the head end of the skirt 300 to bulge around the jig head 200, as seen in FIGS. 1A-1C. The jig head 200 includes a hook 230 which extends out through the opening 341 and curls over and extends above at least a portion of the skirt 300. An eyelet 231 also extends through the skirt 300. The tail end 330 of the skirt 300 includes a slit 335 which splits the tail end 330 into two split tail portions 339a, 339b.

The features of the jig 100, including those numbered elements in FIGS. 1A-1D not already described, will become more fully apparent from the following detailed descriptions of the jig head 200 and the skirt 300.

Figure 2A:
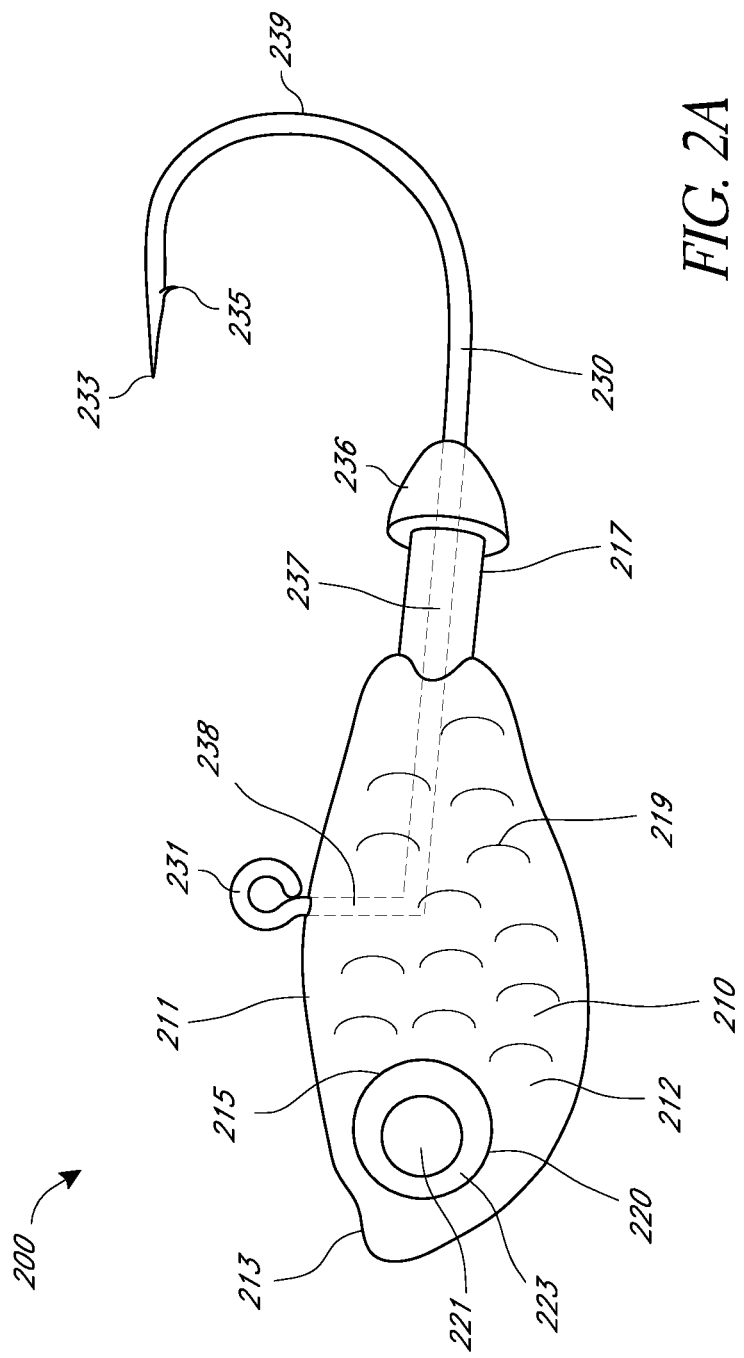
FIG. 2A shows a side view of the jig head of the jig of FIG. 1A.

FIG. 2A shows a side view of the jig head 200 of the jig 100 of FIG. 1A. The jig head 200 includes a body 210 and a hook 230. In some embodiments, the body 210 is over-molded around an forward portion of the hook 230, such that an forward portion of the hook 230 is internal to the body 210 (as illustrated with dashed lines in the figure) and a rear portion of the hook 230 is external to the body 210.

The body 210 may be made from a metal, such as lead, for example, so as to provide weight for the jig 100. The size of the body 210 may be varied so as to provide a specific weight. In some embodiments, the size of the body 210 is chosen so that the weight of the jig head 200 is between approximately 1/64 ounce and 5 ounces, for example, 1/32 ounce, 1/16 ounce, 1/8 ounce, 1/4 ounce, 3/8 ounce, 1 ounce, 1 and 1/2 ounce, 2 ounce, 3 ounce, 4 ounce, 5 ounce or any other weight therebetween. In some embodiments, larger or smaller jig heads 200 of lighter or heaver weights may be used.

In the illustrated embodiment, the body 210 comprises a bucktail shape, formed with a main portion 212 and a trailing shaft 217. The main portion 212 may be formed in a general fish shape, having a pointed nose 213 and a bulbous body. The trailing shaft 217 extends from the rear of the main portion 212 and may include an expanded rear portion 236. In some embodiments, the main portion 212 of the body 210 includes a shallow recess 215 on each side of the body 210. In some embodiments, an eye 220 is received with the shallow recess 215. In some embodiments, the shallow recesses 215 are positioned on the sides of the body 210 generally behind the pointed nose 221. In some embodiments, the shallow recesses 215 may be omitted.

The body 210 may also include patterning 219 formed on the outer surfaces thereof. In some embodiments, the patterning 219 may be configured to appear as fish scales. In some embodiments, the patterning 219 may be configured as a textured or bumpy surface. In some embodiments, the patterning 219 may be faceted so as to reflect light. In some embodiments, the patterning 219 is an image or pattern printed on the body 210. The patterning 219 may be formed on the entire outer surfaces of the body 210, although this need not be the case in all embodiments. For example, in some embodiments, the patterning 219 may be formed on only a portion of the outer surfaces of the body 210. In some embodiments, the patterning 219 may be omitted.

As noted above, the jig head 200 includes eyes 220 on each side of the body 210. In some embodiments, the eyes 220 are distinct elements that may be attached to the body 210, for example, by adhesive. In some embodiments, the eyes 220 may be features which are painted onto the body 210. In some embodiments, the shallow recess 215 or a hole can represent the eye 220. In embodiments of the body 210 that include the shallow recesses 215 described above, the eyes 220 may be inserted into (or otherwise attached) at the shallow recesses 215. The eyes 220 may be rounded so as to extend out from the shallow recesses 215. In the illustrated embodiment, the eyes 220 include a darkened central pupil 221 surrounded by a lighter iris 223. In some embodiments, the central pupil 221 is black and the iris 223 is clear or white, although any other color combination, including combinations where the central pupil 221 is lighter than the iris 223, is possible. In some embodiments, the eyes 220 may comprise a single color. In some embodiments, the eyes 220 are configured to mimic the shape and coloring of a fish, and may be designed to be as life like as possible.

In some embodiments, the outer surfaces of the body 210 and/or the eyes 220 may include an ultraviolet reflective coating. The ultraviolet reflective coating may be configured to reflect ultraviolet light to increase the visibility of the jig 100. The ultraviolet reflective coating may cause the jig 100 to flash or light up as ultraviolet light reflects off the coating as the jig 100 moves through the water. The ultraviolet reflective coating may increase the jig's visibility to fish even in dark or murky water due to the fact that ultraviolet light penetrates water deeper than human-visible light. In one embodiment, the ultraviolet coating is UV Blast! Clear Seal Coat provided by CS Coatings of Wausau, Wis. In some embodiments, the ultraviolet reflective coating may be omitted.

The jig head 200 also includes a hook 230. In the illustrated embodiment, the hook 230 is an Aberdeen-style hook, although this need not be the case in all embodiments and any style of hook may be used. The hook 230 includes an eyelet 231 for attaching the jig 100 to a fishing line. In the illustrated embodiment, the eyelet 231 extends from a top portion 211 of the jig head 200. However, in some embodiments, the eyelet 231 may extend from a front portion of the jig head 200, for example, the pointed nose 213. The hook 230 includes a shank 237 which extends from the eyelet 231 to the bend 239 of the hook 230. The bend 239 of the hook 230 is tipped with a point 233 and may also include a barb 235. In embodiments where the eyelet 231 extends from the top portion 211 of the jig head 200, the shank 237 may also include a bent portion 238, which is formed at an approximately 90-degree angle to the remainder of the shank 237. As shown in FIG. 2A, the bent portion 238 and a portion of the remainder of the shank 237 are positioned within the body 210. The shank 237 extends internally through the body 210 and out the trailing shaft 217. In some embodiments, the central axis of the shank 237 is aligned and/or coaxial with the central axis of the trailing shaft 237.

The hook 230 may be of any size. In some embodiments, the size of the hook 230 is chosen to correspond to the weight and/or size of the body 210 of the jig head 200, with smaller hooks 230 generally corresponding to smaller or lighter bodies 210. For example, a body 210 with a weight of approximately 1/32 ounce or 1/16 ounce may use a size 6 hook, a body 210 with a weight of approximately 1/8 ounce or 1/4 ounce may use a size 1 or 1/0 hook, a body 210 with a weight of approximately 3/8 ounce or 1 ounce may use a size 3/0 hook, a body 210 with a weight of approximately 1 ounce or 1 and 1/2 ounce may use a size 5/0 hook, and a body 210 with a weight of approximately 2 ounce to 5 ounce may use a size 5/0 or larger hook. However, these combinations are provided by way of example only, and other combinations of differently sized bodies 210 and differently sized hooks 230 are possible.

In some embodiments, the hook 230 may be a black nickel Aberdeen jig hook, although other types of hooks are possible and within the scope of this disclosure.

FIG. 2B shows a side view of another embodiment of a jig head 200a that can be used in the jig 100 of FIG. 2A. The jig head 200a includes a body 210a that is formed with a darter head shape, as opposed to the bucktail head shape of the body 210 of FIG. 2A. In other regards, the jig head 200a may be substantially similar to the jig head 200 described above. Similarly numbered elements in FIG. 2B are generally substantially similar to elements previously described in reference to FIG. 2A and, for the sake of brevity, description of these elements is not repeated here. For example, the hook 230a may be substantially similar to the hook 230 described above.

Although FIGS. 2A and 2B show jig heads 200a, 200b with bucktail-head and darter-head shaped bodies 210, 210a, respectively, this disclosure is not intended to be limited to only these shapes. For example, the jig 100 as described herein is useable with jig heads 200 having bodies 210 of any shape, including, but not limited to, tube heads, bullet heads, mushroom heads, shad heads, etc. In some embodiments, the shape of the body 210 of the jig head 200 is configured so as to give the jig 100 the appearance of a realistic bait fish when the jig head 200 is used with the skirt 300 as described herein.

Figure 3D:
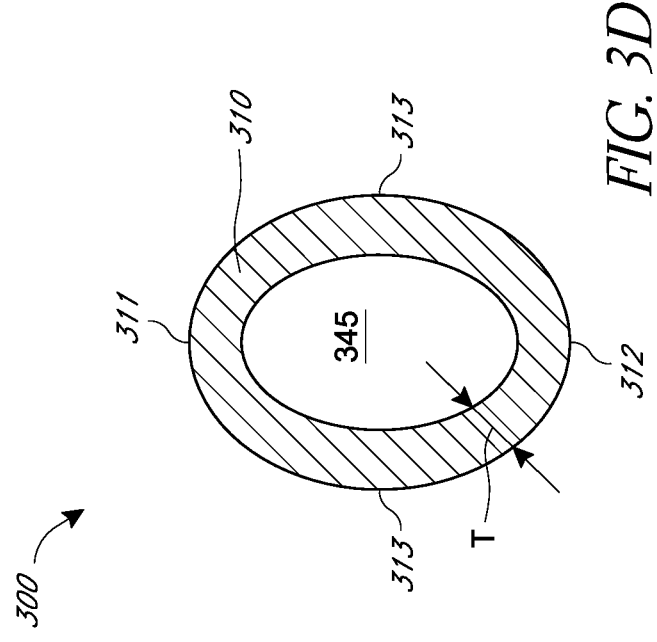
FIG. 3D is a cross-sectional view of the skirt taken along the line shown in FIG. 3A.
Figure 3C:
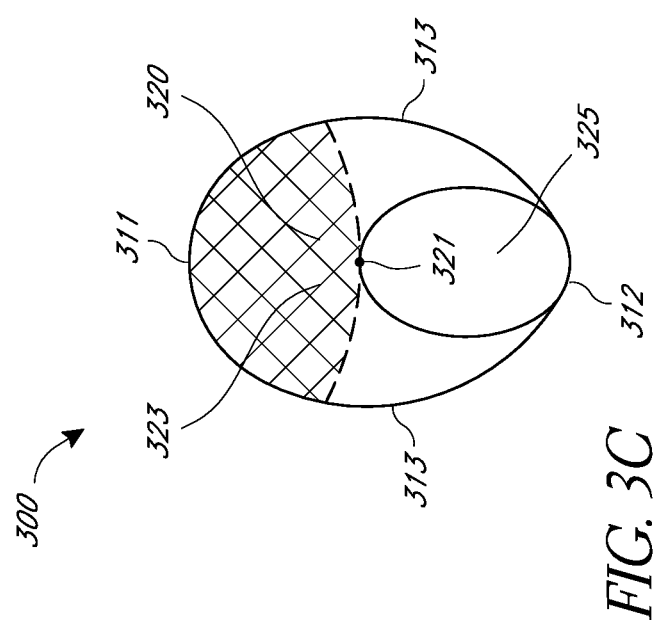
FIG. 3C shows a front view of the skirt of FIG. 3A.

FIG. 3A shows a side view of the skirt 300 of the jig 100 of FIG. 1A. FIG. 3B shows a top view of the skirt 300, and FIG. 3C shows a front view of the skirt 300. FIG. 3D is a cross-sectional view of the skirt 300 taken along the line shown in FIG. 3A. As shown in these figures, the skirt 300 includes a generally tubular body 310 having a top 311, a bottom 312, and opposing sides 313. As shown in the cross-sectional view of FIG. 3D, the tubular body 300 is hollow and defines a channel 345 that is formed therein. The channel 345 defines a space into which the jig head 200 is inserted in the assembled state (as shown in FIGS. 1A-1D). In some embodiments, the size of the channel 345 is configured to correspond to the size of the jig head 200, such that the jig head 200 is retained within the channel 345 via a friction fit. For example, the longitudinal cross-sectional shape of the jig head 200 may be slightly larger than the longitudinal cross-sectional shape of the tubular body 310 and channel 345 (as shown in FIG. 3D), such that the jig head 200 is retained within the channel 345 when inserted. The tubular body 310 extends between a head end 320 and a tail end 330. In general the head end 320 is closed and the tail 330 end is open.

The skirt 300 may be formed from a soft plastic material. As used herein, the term "soft plastic material" is used broadly to refer to any flexible, deformable, and/or elastic plastic or rubber material. Many such materials are known in the art and are commonly used for creating soft plastic fishing baits or lures. For example, the skirt 300 may be formed from Liquid Plastic—Salt Water Formula provided by the M-F Manufacturing Company of Fort Worth, Tex., or other similar materials. In general, the soft plastic material may be transparent or semitransparent, such that the jig head 200 is at least partially visible through the skirt 300 when the jig head 200 is inserted into the channel 345 (for example, in the configuration of FIGS. 1A-1D).

The soft plastic material may be mixed with a coloring agent or dye, so that the skirt 300 can be provided in a wide variety of colors, while still remaining at least semitransparent. In some embodiments, a portion of the skirt 300, for example the lower portion 316, may include a first color, and another portion of the skirt 300, for example, the upper portion 318, may include a second color. In the figures the upper portion 318 has been illustrated with cross-hatching. In some embodiments, both the first and second colors are transparent or semitransparent. In some embodiment, the first color is more transparent than the second color, or vice versa. In some embodiments, only one of the first color or the second color is transparent or semitransparent. As will be described below, in some embodiments, the skirt 300 may be manufactured entirely from a soft plastic of the first color, and the second color may be applied on top of the first portion to create the two-color pattern. Various colors and color combinations are possible and may be chosen to mimic the color patterns of bait fish. For example, the skirt may be silver and sardine green (minnow/shad), black and gold (minnow/perch fry), brown and gold (minnow/perch fry), orange and gold (roe/bright minnow), yellow and silver (bright minnow), pink and silver (roe/bright minnow), fluorescent green and silver (bright minnow/shad), white shad (minnow/shad), or any number of other colors or combinations. In the some embodiments, glitter or other flecks may be mixed into the soft plastic material to more accurately reflect the look and patterning of live bait fish. In some embodiments, a scent that attracts fish may be mixed into the soft plastic material. In some embodiments, the upper portion 318 may not cover they eye 220 of the jig head 200 when the jig head 200 is positioned within the skirt 300. Accordingly, the upper portion 318 may include a cut out over the eye 220. This may allow the eye 220 to be more easily visible.

In the illustrated embodiment, the head end 320 includes a pointed nose 321 formed at the front most end of the skirt 300. The pointed nose 321 may be formed by a curved portion 323 that extends from the top 311 of the tubular body 310 and a flat portion 325 that extends from the bottom 312 of the tubular body 310, as shown in the side view of FIG. 3A. The curved portion 323 may comprise a generally convex outward shape that tapers from the top 311 and sides 313 of the tubular body 310 to a point (the pointed nose 321). The flat portion 325 may be generally planar, and, as will be described below in greater detail, may be formed as angled cut through the lower front portion of the tubular body 310 (see for example, FIG. 8 and corresponding text). As seen in the front view of FIG. 3C, the flat portion 325 appears as an oval shaped planar surface that extends from the bottom 312 and sides 313 of the tubular body 310 to the pointed nose 321.

In some embodiments, the plane of the flat portion 325 is formed at an angle 326 relative to a plane that is normal to the bottom 312 of the tubular body 310. In some embodiments, the angle 326 is less than approximately 75 degrees, less than approximately 60 degrees, less than approximately 50 degrees, less than approximately 45 degrees, less than approximately 40 degrees, less than approximately 35 degrees, less than approximately 30 degrees, or less than approximately 25 degrees. In some embodiments, the angle 326 is between approximately 75 degrees and approximately 25 degrees, between approximately 60 degrees and approximately 25 degrees, between approximately 50 degrees and approximately 25 degrees, between approximately 45 degrees and approximately 25 degrees, between approximately 50 degrees and approximately 30 degrees, or between approximately 45 degrees and approximately 30 degrees. In some embodiments, the angle 326 is approximately 50 degrees, approximately 45 degrees, approximately 40 degrees, approximately 35 degrees, approximately 30 degrees, or approximately 25 degrees. However, these ranges and angles are provided by way of example only, and other ranges and angles are possible.

In some embodiments, the side profile of the pointed nose 321 may point slightly downward relative to the longitudinal axis of the skirt 300. In some embodiments, the tip of the pointed nose 321 falls above or below a plane which divides the bottom portion 316 from the top portion 318 of the skirt 300. Stated another way, in some embodiments, the tip of the pointed nose 321 is positioned above or below the central longitudinal axis of the tubular body 310. That is, the pointed nose 321 may not be aligned with the central longitudinal axis of the tubular body 310 in some embodiments. However, in some embodiments, the pointed nose 321 is aligned with the central longitudinal axis of the tubular body 310.

The pointed nose 321, including the flat portion 325, may give the jig 100 a realistic darting and sinking action in use that mimics the motion of live bait fish and/or attracts fish. In some embodiments, the pointed nose 321 and/or the flat portion 325 may be omitted, and the closed head end 320 of the tubular body 310 may be formed with a generally rounded, angled, or flat shape. In some embodiments, the pointed nose 321 may be omitted.

The tail end 330 is formed on the tubular body 310 opposite the head end 320. As illustrated in the figures, and shown particularly in FIG. 3A, the profile of the tail end 330 includes a taper 331 that extends from a taper start point 332 to the tip 333 of the tail end 330. The taper 331 causes the thickness of the tail end 330 to gradually narrow from the overall width of the tubular body 310 to the tip 333. In some embodiments, the taper start point 332 begins on the top 311 of the tubular body 310, and the tip 333 is positioned on the bottom 312 of the tubular body 310. In these embodiments, the top surface of the tubular body 310 may be shorter (extending from the pointed nose 321 to the taper start point 332) than the bottom surface of the tubular body 310 (extending from the pointed nose 321 to the tip 333). Other configurations for the taper 331 are also possible. For example, the taper start point 332 may begin on the bottom 312 and end at a tip positioned on the top 311, or the taper start point 332 may begin on one side 313 and end at a tip positioned on the opposite side 313. In some embodiments, the tubular body 310 includes more than one taper 331. For example, top 311 and bottom 312 could each taper to a tip that is formed between the top 311 and bottom 312. In some embodiments, the taper start point 332 is positioned approximately at the midpoint of the overall length dimension of the skirt 300, although this need not always be the case. For example, the taper start point 332 may be positioned before or after the midpoint of the overall length dimension of the skirt 300.

In some embodiments, the angle 344 of the taper 331 (as measured relative to a plane normal to the top 311 of the tubular body 310 as shown in FIG. 3A) is constant. For example, the profile of the taper 331 may be formed as a straight line angling from the taper start point 332 to the tip 333. In some embodiments, the angle 344 of the taper 331 varies. For example, the angle 334 may increase or decrease from the taper start point 332 to the tip 333. For example, the profile of the taper 331 may be a convex or concave curve. In some embodiments, the taper 331 may be formed as a wave, including convex and concave portions along its length.

Figure 11:
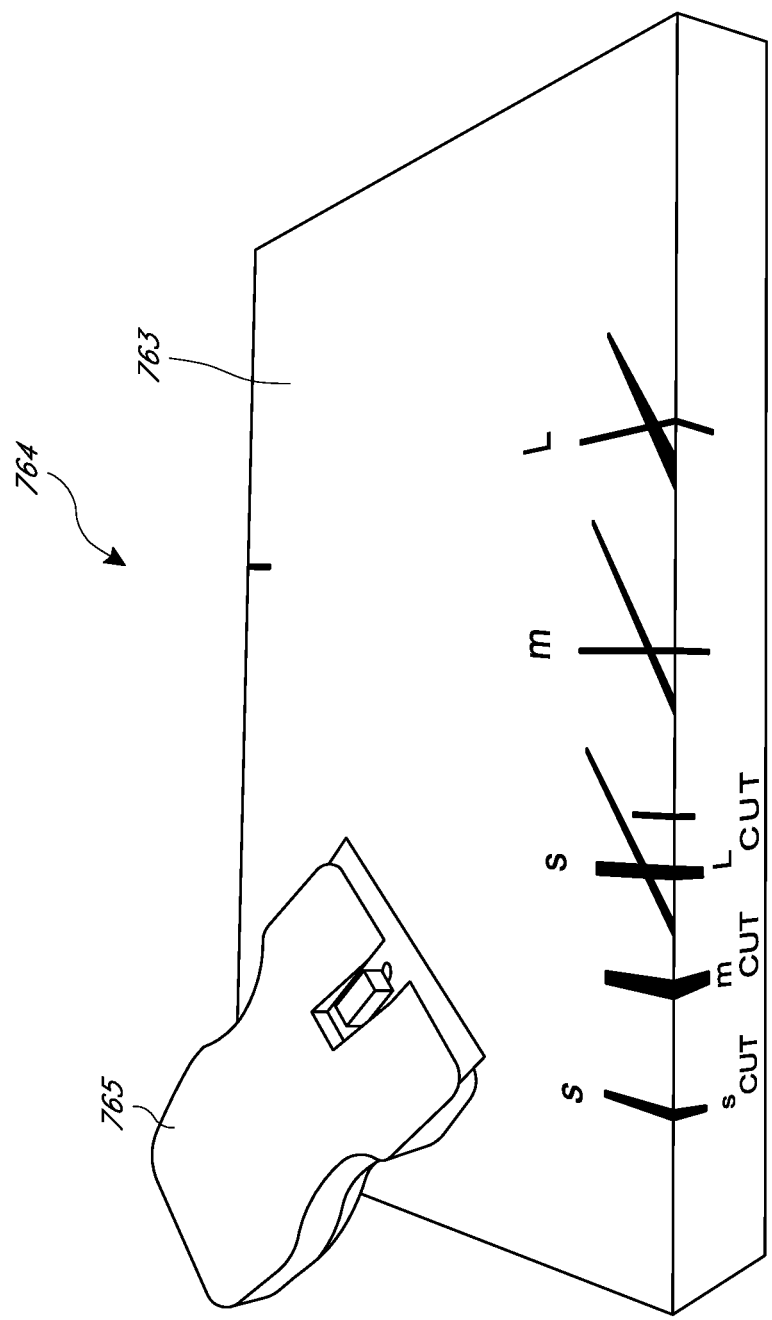
FIG. 11 illustrates a cutting board and a cutting tool for measuring and cutting skirts as part of the manufacturing process, according to one embodiment.

As best seen in the top view of FIG. 3B, the taper 331 forms an opening 341 in the tail end 330 of the tubular body 310. As will be described below in greater detail, the taper 331 may be formed by cutting the tubular body 310 at the angle 344 from the taper start point 332 to the tip 333 (see, for example FIG. 11 and the corresponding text). Because the cut passes through the channel 345, the taper 331 forms the opening 341. The opening 341 may be considered a beveled opening because the general outline of the opening lies within a plane that is angled (at the angle 344) relative to the longitudinal axis of the tubular body 310.

The tail end 330 of the skirt 300 also includes a slit 335 that extends from the tip 333 to a slit stop point 337. The slit 335 divides the rearmost portion of the tail end 330 into two split tail portions 339a, 339b. In some embodiments, the slit 335 is formed through the bottom 312 of the tubular body 310. In some embodiments, the slit 335 lies in a plane that divides one side 313 from the opposite side 313. In some embodiments, the tip 333, the slit stop point 337, and the taper start point 332 all lie in a single plane. The slit stop point 337 may fall in a plane normal to the longitudinal axis of the tubular body 310 that is between a plane normal to the longitudinal axis of the tubular body 310 containing the taper start point 332 and a plane normal to the longitudinal axis of the tubular body 310 containing the tip 333. Stated another way, when viewed along the length of the tubular body 310, the slit stop point 337 may fall between the taper start point 332 and the tip 333. In some embodiments, the slit stop point 337 is approximately midway between the taper start point 332 and the tip 333 when viewed along the length of the tubular body 310, although this need not always be the case and the slit stop point 337 may be before or after the midpoint between the taper start point 332 and the tip 333 when viewed along the length of the tubular body 310. Therefore, in some embodiments, because the slit 335 does not extend all the way to the taper start point 332, the slit 335 and/or split tail portions 339a, 339b are unlikely to become caught or tangled on the hook or line. Thus, the jig 100 is more likely to run true more often. However, in some embodiments, the slit 335 may extend from the tip 333 to (or beyond) the taper start point 332. The slit 335 and split tail portions 339a, 339b are configured to create an action for the jig 100 during use that mimics live bait fish and/or triggers fish to strike.

The skirt 300 may be configured in a variety of different sizes and/or lengths that may correspond with the variously sized jig heads 200 described above. For example, in some embodiments, the overall length of the skirt 300 may be between approximately 1 inch and 8 inches. In some embodiments the length of the skirt is approximately 2 inches, approximately 3 inches, approximately 4 inches, approximately 5 inches, or approximately six inches. The tubular body 310 of the skirt 300 may have a wall thickness T, as shown in FIGS. 1D and 3D, of between approximately 1/16 of an inch and 1/2 of an inch, although thicker and thinner wall thicknesses are possible. In some embodiments, the wall thickness T varies along the length of the skirt 300. For example, the head end 320 may comprise a thicker wall thickness than the tail end 330, or vice versa.

Figure 4:
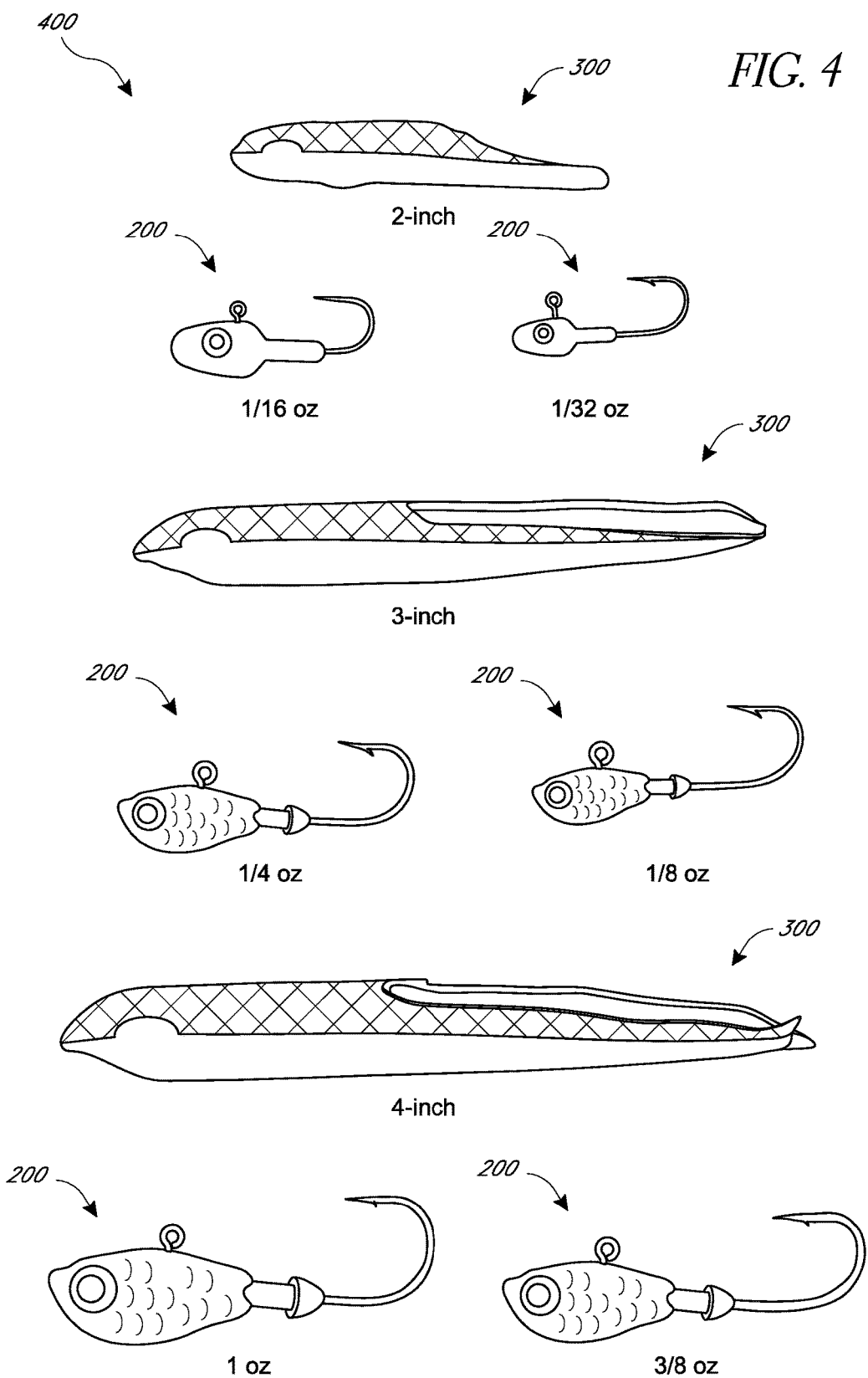
FIG. 4 illustrates one embodiment of a fishing jig system including variously sized jig heads and skirts that may be combined in different combinations to produce different jigs.

FIG. 4 illustrates one embodiment of a fishing jig system 400 including variously sized jig heads 200 and skirts 300 that may be combined in different combinations to produce different sized and weighted jigs 100. The system 400 may allow an angler to customize a jig 100 for a particular target fish or fishing condition by selecting and combining a desired jig head 200 with a desired skirt 300.

In the illustrated embodiment, the system 400 includes a 1/32 ounce jig head 200 and a 1/16 ounce jig head 200 that are sized to be selectively combinable with a 2-inch long skirt 300, a 1/8 ounce jig head 200 and a 1/4 ounce jig head 200 that sized to be selectively combinable with a 3-inch long skirt 300, and a 3/8 ounce jig head 200 and a 1 ounce jig head 200 that are sized to be selectively combinable with a 4-inch long skirt. Although not pictured, the system 400 may also include a 1 ounce jig head 200 and 1 and 1/2 ounce jig head 200 sized to be selectively combinable with a 6-inch long skirt 300. Other combinations of jig heads 200 and skirts 300 are possible. Further, in another embodiment, the system 400 may also include differently colored skirts 300, allowing for an even greater number of combinations.

Figure 5A:
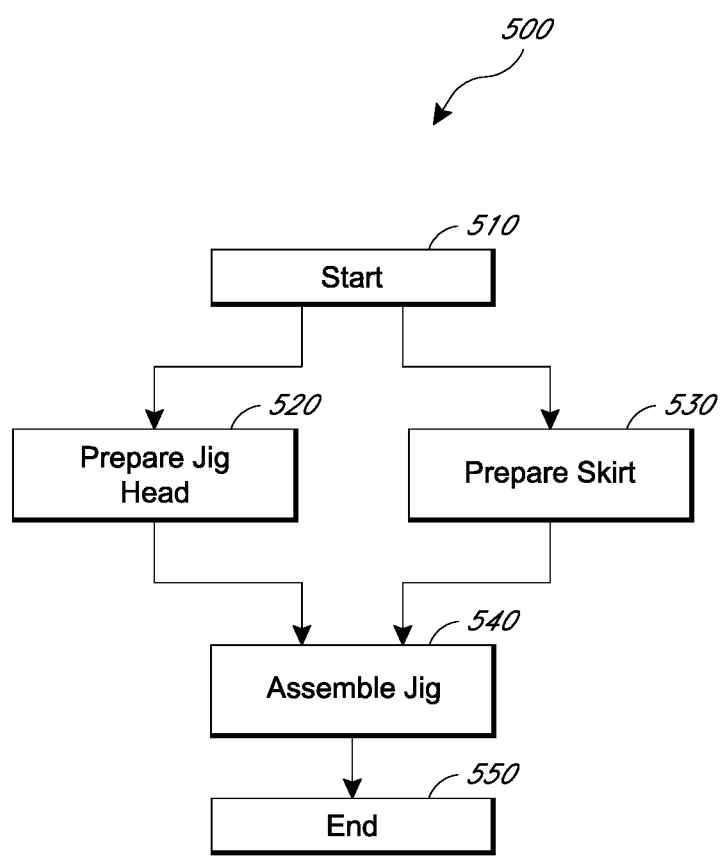
FIG. 5A is a flow chart depicting one embodiment of a method for manufacturing a jig.
Figure 5B:
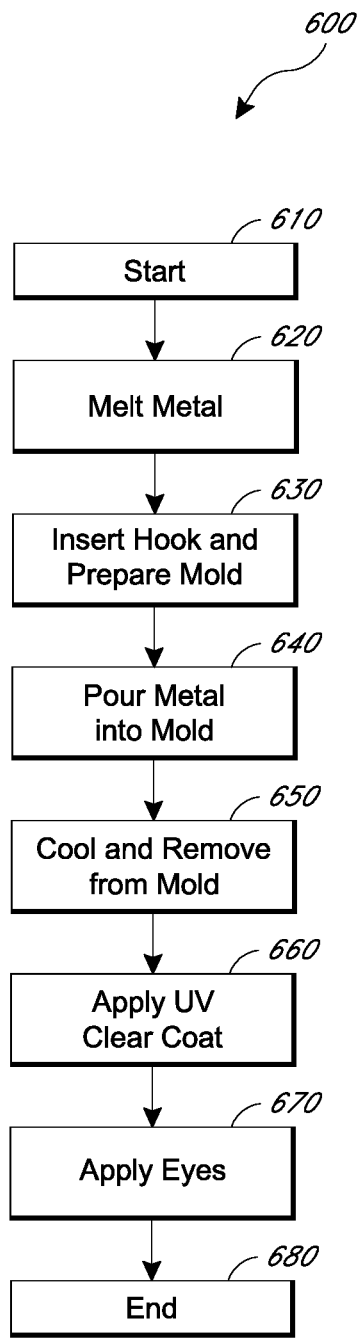
FIG. 5B is a flow chart depicting one embodiment of a method for manufacturing a jig head for a jig.
Figure 5C:
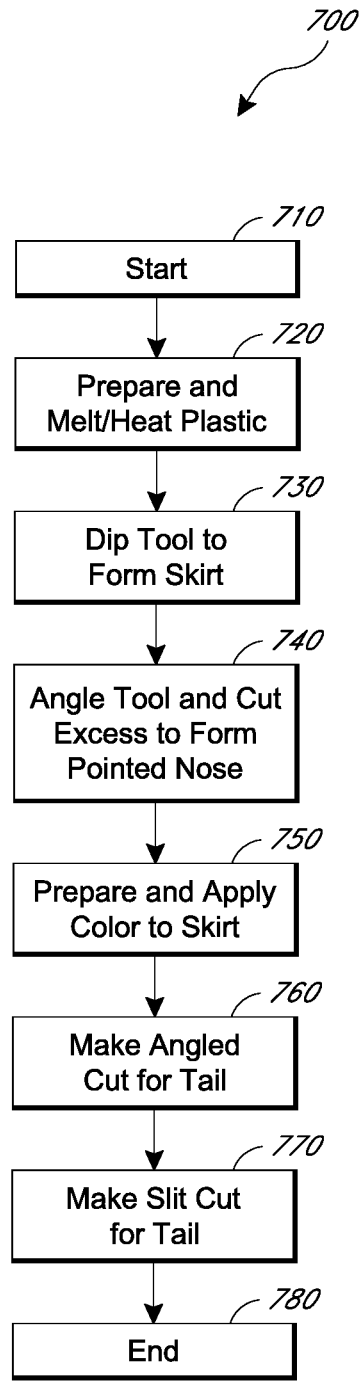
FIG. 5C is a flow chart depicting one embodiment of a method for manufacturing a skirt for a jig.

FIG. 5A is a flow chart depicting one embodiment of a method 500 for manufacturing a jig, such as the jig 100 described above. The method 500 begins at block 510. At block 520, the jig head 200 is prepared. In general preparing the jig head 200 may involve, selecting a pre-manufactured or commercially available jig head 200 or manufacturing a jig head 200. FIG. 5B outlines a method 600, described below, for manufacturing a jig head 200. At block 530, the skirt 300 is prepared. FIG. 5C outlines a method 700, described below, for preparing or manufacturing the skirt 300. In general, the blocks 520 and 530 can be performed sequentially (in either order) or at substantially the same time. Upon completion of the blocks 520 and 530, the method 500 proceeds to block 540 where the jig 100 is assembled. In general, assembly of the jig 100 includes inserting the jig head 200 into the channel 345 of the skirt 300. A detailed method 800 for assembling the jig 100 is described below in reference to FIG. 5D. Once the jig 100 is assembled, the method 500 ends at block 550.

FIG. 5B is a flow chart depicting one embodiment of a method 600 for manufacturing a jig head 200 for a jig 100. The method 600 begins at block 610. In some embodiments, the method 600 may begin with a user selecting a size or weight of jig head 200 to manufacture. This may be any of the sizes described previously. The user may also gather the required materials, which may include metal for forming the body 210 of the jig head 200, for example lead, a hook 230, eyes 220, an ultraviolet reflective coating, equipment for melting the metal, and a mold (such as the mold 625 shown in FIG. 12). At block 620, the user heats and melts the metal.

Figure 12:
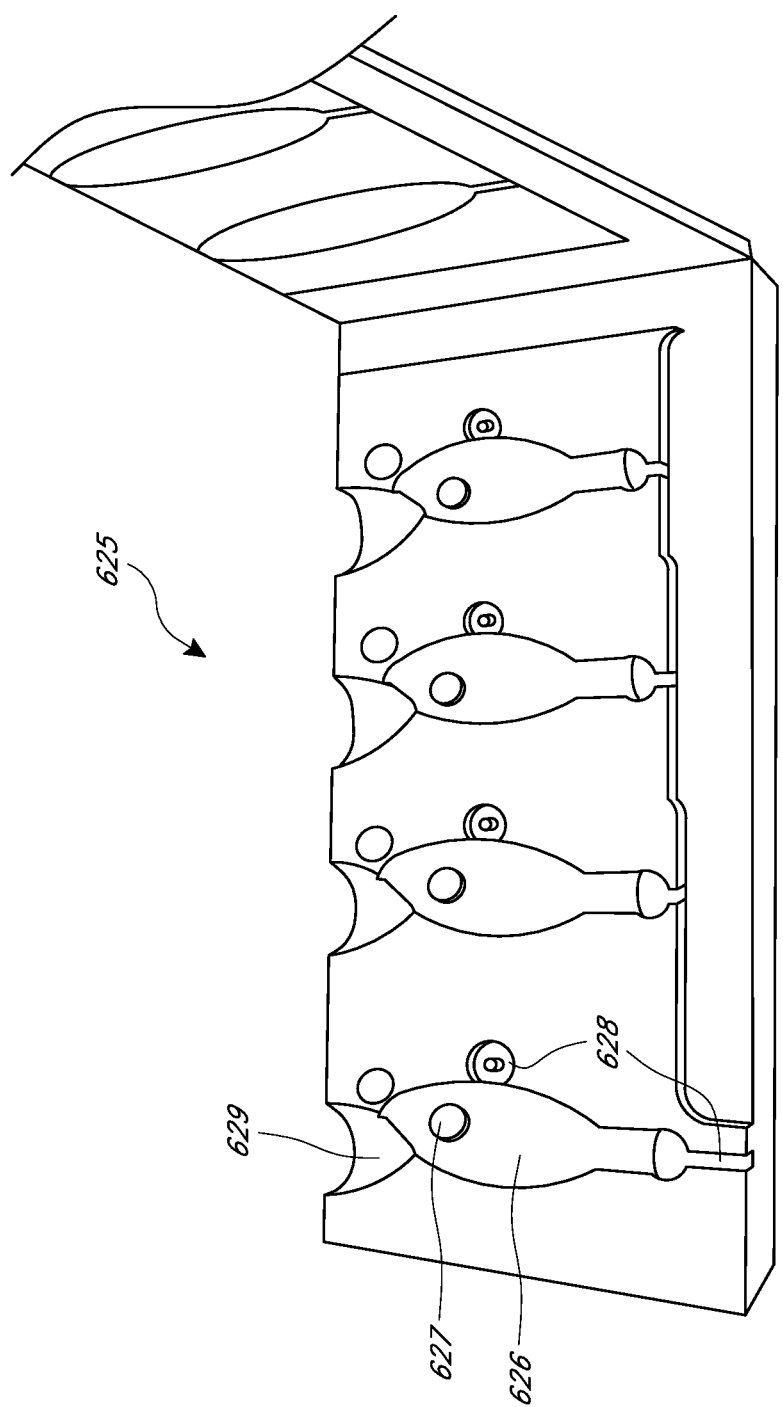
FIG. 12 illustrates one embodiment of a mold for forming at least one jig head.

At block 630, the user prepares the mold 625. This may include selecting a mold 625 that corresponds to the desired size jig head 200 to be manufactured. Various molds 625 are provided for forming different sized jig heads 200. As shown in FIG. 12, the mold 625 includes opposing sides (only one of which is visible) that come together to form a cavity having the shape of the body 210 jig head 200. Each side of the mold 625 includes a recess 626 in the shape of one half of the body 210 of the jig head 200. The recess 626 may include a feature 627 for forming the shallow recess 215 for receiving the eye 220. The recess 626 may also include features for forming the patterning 219. The mold 625 also includes cutouts 628 that are configured to secure portions of a hook 230, such that the body 210 can be formed around the hook 230. The mold 625 also includes a sprue hole 629, through which molten metal can be poured into the cavity 626. To prepare the mold 625, the user inserts the hook 230 into the cutouts 628 and closes the mold 625.

At block 640, the user pours the molten metal into the cavity 626 through the sprue hole 629. At block 650, the molten metal is allowed to cool and solidify into the shape of the cavity 626. Once cool, the user may open the mold 625 and remove the formed jig head 200. At block 660, the user applies the ultraviolet reflective coating to the outer surfaces of the jig head 200. The ultraviolet reflective coating can be painted or sprayed on the jig head 200 or the jig head 200 may be dipped into the ultraviolet reflective coating. At block 670, the user applies the eyes 220 to the jig head 200. This can include adhesively attaching preformed eyes 220 to the jig head 200 or painting eyes 220 onto the jig head 200. In some embodiments, the eyes 220 are applied before the ultraviolet reflective coating, such that the coating is formed over the eyes 220. The method ends at block 680.

FIG. 5C is a flow chart depicting one embodiment of a method 700 for manufacturing a skirt 300 for a jig 100. The method 700 begins at block 710. In some embodiments, the method 700 may begin with a user selecting a size of skirt to manufacture 300. This may be any of the sizes described previously. The user may also gather the required materials, which may include the raw soft plastic material, coloring materials, and various tools (some of which are shown in FIGS. 6-11).

Figure 7:
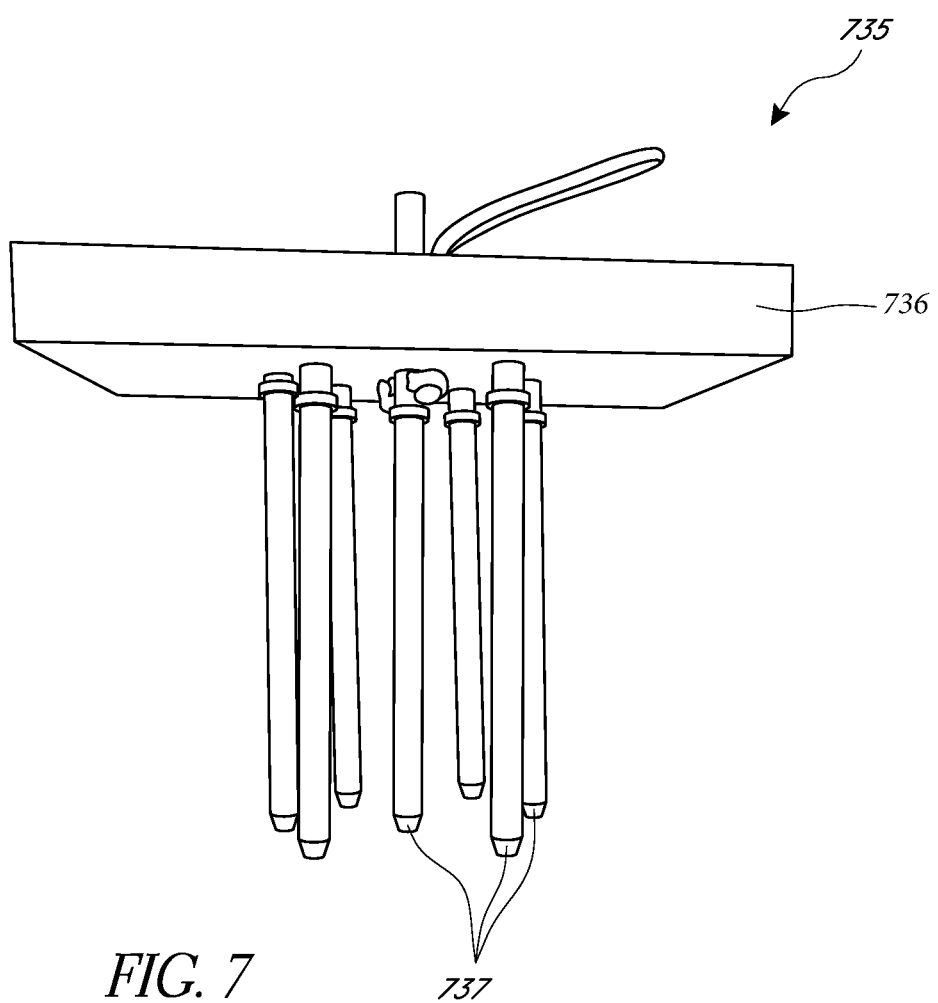
FIG. 7 shows a perspective view of one embodiment of a tool for manufacturing a plurality of skirts.

At block 720, the user prepares the soft plastic material. This may include heating/melting the soft plastic material in a heating tool 725 as shown in FIG. 7. The heating tool 725 may include controls 726 for selecting a desired temperature. In general, the soft plastic material is heated until it assumes a viscous consistency. Also at block 720, coloring, glitter, flecks, and/or scent can be added to the soft plastic material.

At block 720, the user forms the rough shape of the tubular body 310 of the skirt 300 by dipping a tool 735 (as shown in FIG. 7) into the heated soft plastic material. In some embodiments, the tool 735 is dipped into the soft plastic material while the soft plastic material is in the heating tool 725. The tool 735 includes a block 736, from which one or more rods 737 extend. The rods 737 are configured to have diameters that correspond with the diameter of the channel 345 of the tubular body 310. For example, in some embodiments, the diameters of the rods 737 may be between approximately 2/32 of an inch and 8/32 of an inch, although smaller or larger diameters are possible. The rods 737 may also include rounded ends. Inclusion of multiple rods 737 on the tool 735 may allow for the substantially simultaneous forming of multiple tubular bodies 310. At block 730, the rods 737 are dipped into the heated plastic material and removed. A coating of the plastic material forms on the rods 737. The rods 737 may be redipped until the coating of plastic material has the desired thickness (for example, the wall thickness T, described above).

Figure 8:
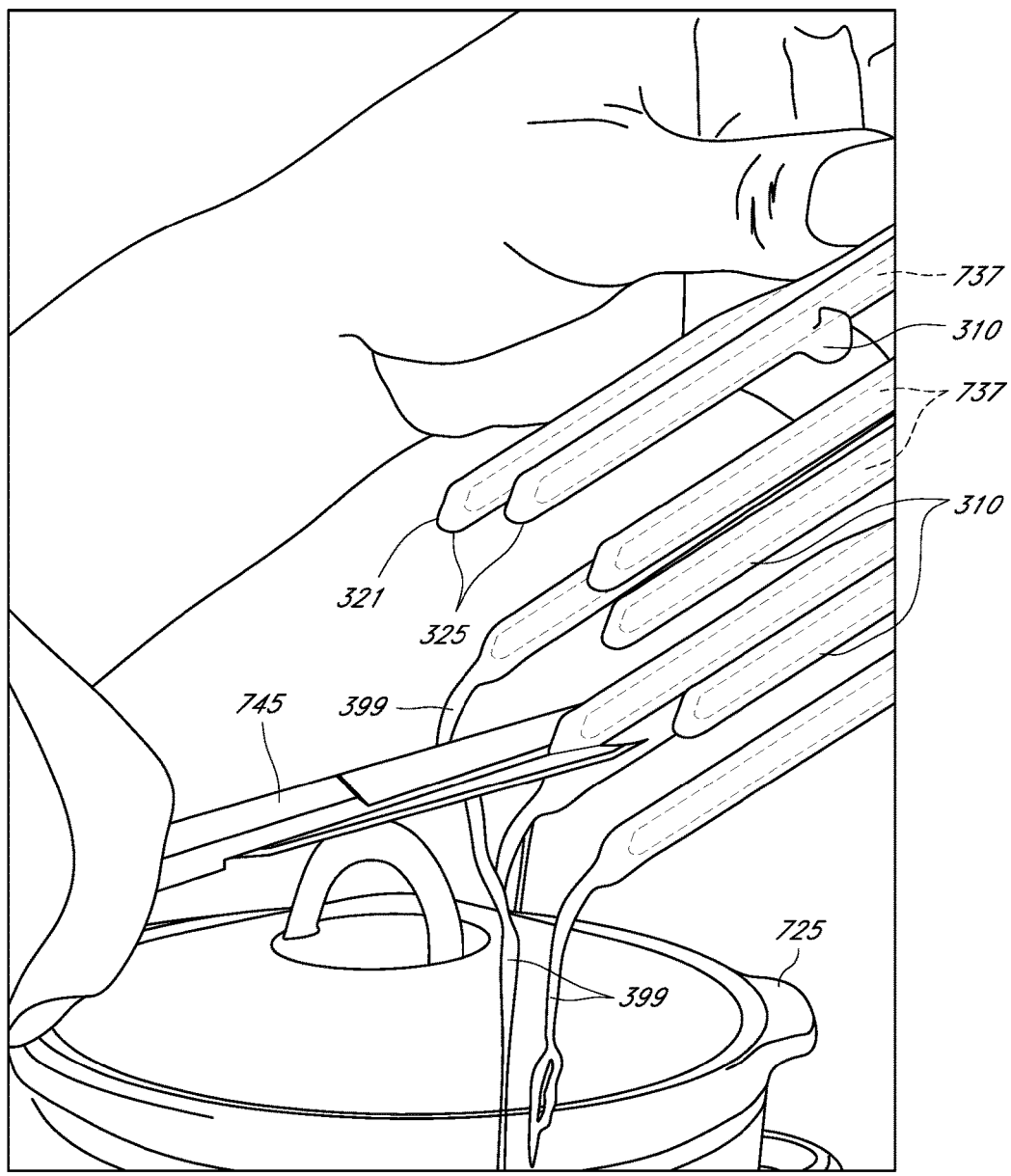
FIG. 8 illustrates a user trimming a drip trail from a skirt that has been formed using the tool of FIG. 7.

At block 740, the tool 735 is held at an angle as the soft plastic material cools. As the rods 737 are dipped and removed from the heated soft plastic material, excess material creates long drip trails 399 extending from the front end of the tubular body 310. When the tool 735 is held at angle (for example, as shown in FIG. 8), gravity causes the drip trails 399 to angle down relative to the tubular body 310. The angle at which the tool is held may be between approximately 75 and 25 degrees or approximately 45 degrees. Once the soft plastic material has cooled, a trimming tool 745 (for example, scissors) is used to trim the drip tails 399 from the tubular bodies 310. This process may form the pointed noise 321 and flat portion 325 (created by the cut plane) on the head end 320 of the tubular body 310. The tubular bodies 310 may then be removed from the rods 327.

Figures 9A, 9B:
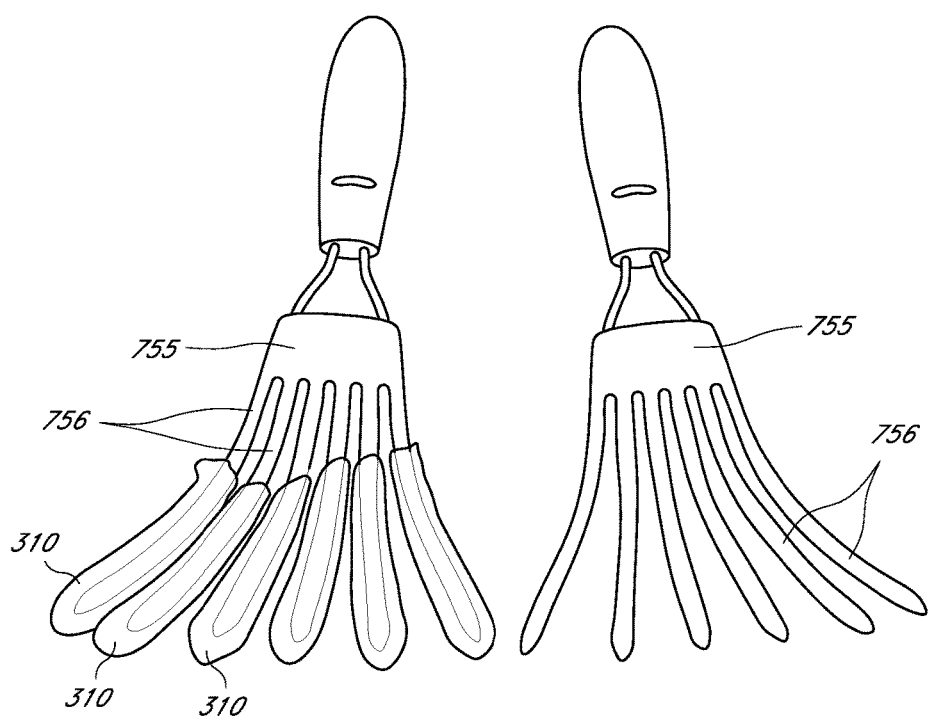
FIG. 9A is a top view of a tool for simultaneously applying color to a plurality of skirts shown with six skirts positioned on the prongs thereof.
FIG. 9B illustrates a top view the tool of FIG. 9A shown with the skirts removed.
Figure 10:
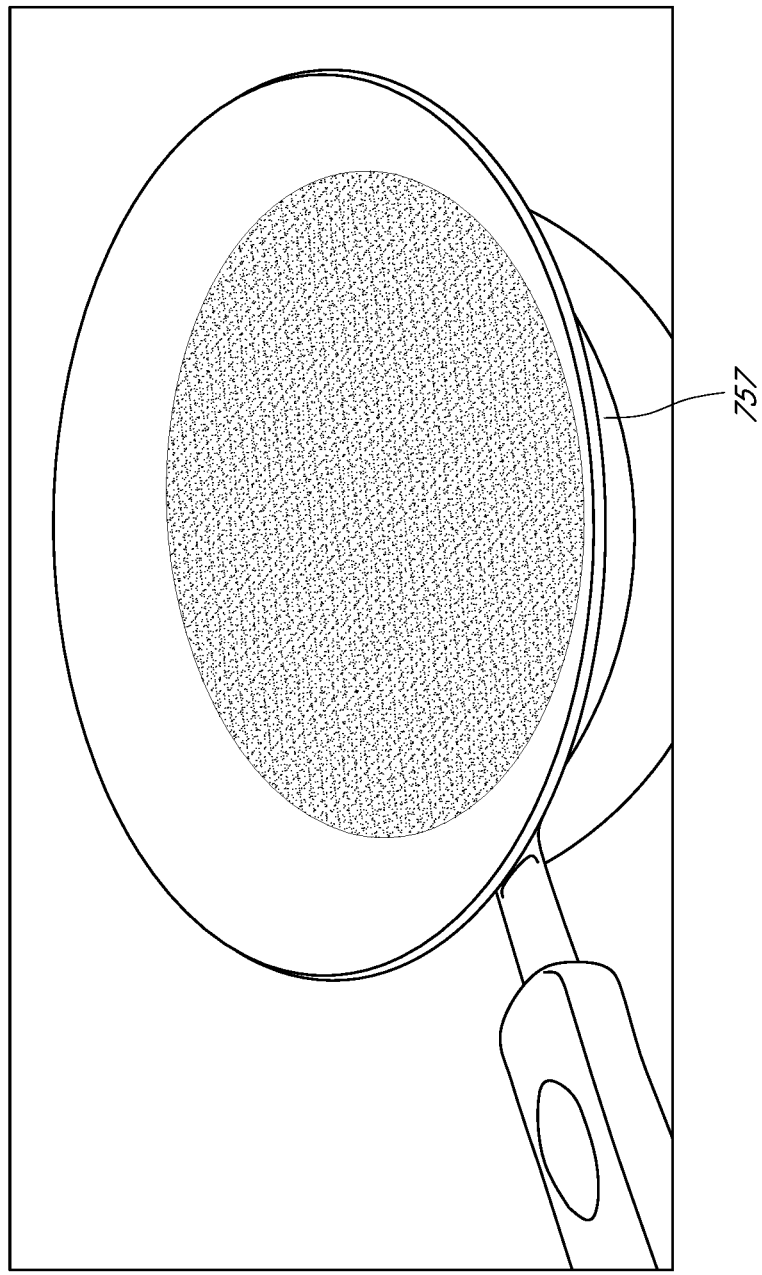
FIG. 10 illustrates a shallow pan containing melted and colored soft plastic material. In some embodiments, the tool of FIGS. 9A and 9B is used to dip a portion of a plurality of skirts into the shallow pan to apply color to the plurality of skirts.

At block 750, the user prepares and applies a second color to the skirt 300 (if desired). This may be accomplished by preparing another portion of heated soft plastic material in a shallow pan 757 as shown in FIG. 10. Coloring, glitter, and/or flecks may be added to the material if desired. The tubular bodies 310 may be transferred to the prongs 756 of another tool 755, as illustrated in FIGS. 9A and 9B. FIG. 9A illustrates the tool 755, which may include a handle with six prongs 756 extending therefrom. In some embodiments, the prongs 756 are curved. In some embodiments, the tool 755 may include greater or fewer than six prongs 756. FIG. 9A shows the tool 756 with six tubular bodies 310 positioned on the six prongs 756. Positioning the tubular bodies 310 on the prongs 756 may include inserting the prongs 756 in the channels 345 of the tubular bodies 310. The tool 755 may be used to dip the top half of each tubular body 310 into the colored and heated soft plastic material, thus applying the color to the top half of each tubular body 310. The tubular bodies 310 may then be removed from the tool 755.

At blocks 760 the taper 331 and opening 341 of the tubular body 310 of the skirt 300 are formed by making an angled cut. For example, a tubular body may be positioned on a cutting board 763 on its side. Using a cutting tool 765 (such as a razor blade), the user may cut the tubular body at an angle from the taper start point 332 to the tip 333. The cutting board 763 may include markings 764 indicating where to cut to form skirts 300 of various sizes. At block 770, the user cuts the slit 335 using the cutting tool 765. Again, markings 764 on the cutting board 763 may indicate where to cut. The method 700 ends at block 780. Although method 700 describes one method for forming the skirts 300, other methods are possible and within the scope of this disclosure. For example, the skirts 300 could be injection molded, using a mold to form the various features of the skirts 300.

Figure 5D:
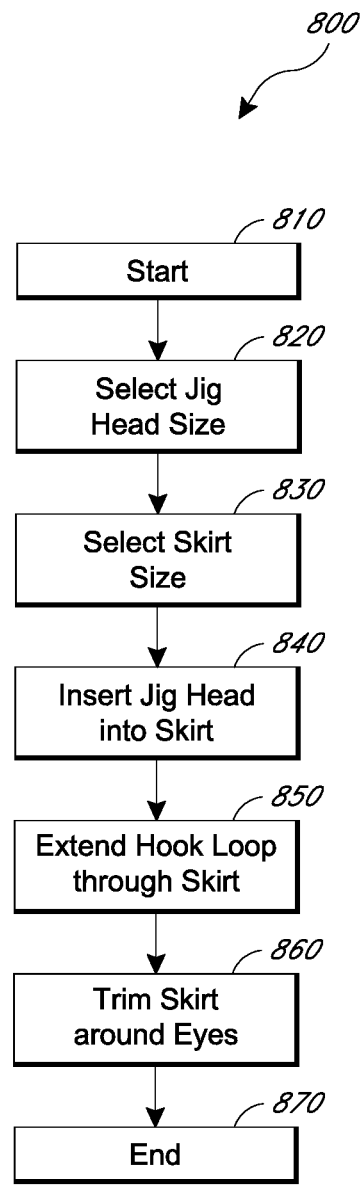
FIG. 5D is a flow chart depicting one embodiment of a method for assembling a jig.
Figure 6:
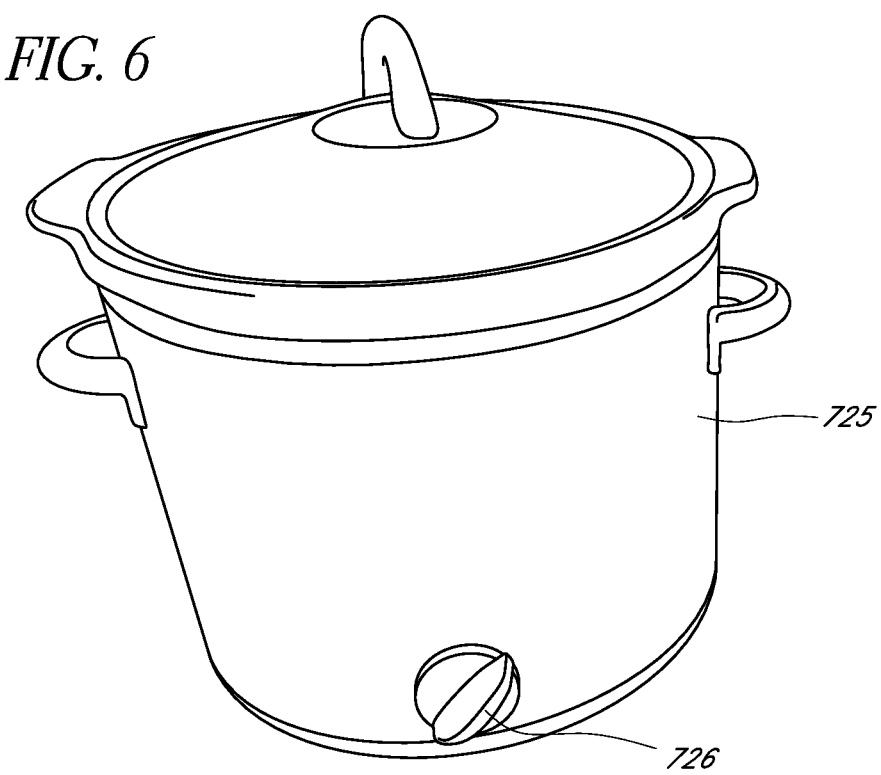
FIG. 6 a perspective view of shows one embodiment of a tool for heating and melting a soft plastic material as part of the process for manufacturing a skirt.

FIG. 5D is a flow chart depicting one embodiment of a method 800 for assembling a jig 100. The method 800 begins at block 810. At block 820, a desired sized jig head 200 is selected. At block 830, a desired sized skirt 300 is selected. At block 840, the jig head 200 is inserted into the skirt 300. The jig head 200 is inserted into the channel 345 of the skirt 300 through the opening 341 in the tail end 330. The jig head 200 is worked down the channel 345 until the pointed nose 213 of the body 210 of the jig head 200 is proximal to the pointed nose 321 of the skirt 300, for example, as seen in FIG. 1D. In this position, the hook 230 extends out of the opening 341 of the skirt 300 near the taper start point 332 and the bend 239 curls back over the skirt 300. At block 850, the eyelet 231 of the hook is forced through the top 311 of the skirt 300. This may require forming a small slit in the top 311 of the skirt 300. At block 860, the skirt 300 may be trimmed so as to more clearly expose the eyes 220. For example, the portion of the second color that is formed above the eyes 220 may be trimmed away. This may remove the added color in the area immediately over the eyes 220 to better expose the eyes. Trimming may not extend entirely through the tubular body 310, such that the eyes 220 are still covered by the tubular body 310. The method 800 ends at block 870. As shown and described in reference to FIGS. 1A-1D, in the assembled state, the various features of the jig head 200 (for example, the eyes 200, patterning 219, and/or ultraviolet reflective coating) are visible through the skirt 300. The jig 100 thus has the appearance of a life like bait fish.

The foregoing description details certain embodiments of the systems, devices, and methods disclosed herein. It will be appreciated, however, that no matter how detailed the foregoing appears in text, the systems, devices, and methods can be practiced in many ways. As is also stated above, it should be noted that the use of particular terminology when describing certain features or aspects of the invention should not be taken to imply that the terminology is being redefined herein to be restricted to including any specific characteristics of the features or aspects of the technology with which that terminology is associated.

It will be appreciated by those skilled in the art that various modifications and changes may be made without departing from the scope of the described technology. Such modifications and changes are intended to fall within the scope of the embodiments. It will also be appreciated by those of skill in the art that parts included in one embodiment are interchangeable with other embodiments; one or more parts from a depicted embodiment can be included with other depicted embodiments in any combination. For example, any of the various components described herein and/or depicted in the figures may be combined, interchanged or excluded from other embodiments.

The above description discloses several methods and materials of the present invention. This invention is susceptible to modifications in the methods and materials, as well as alterations in the fabrication methods and equipment. Such modifications will become apparent to those skilled in the art from a consideration of this disclosure or practice of the invention disclosed herein. Consequently, it is not intended that this invention be limited to the specific embodiments disclosed herein, but that it cover all modifications and alternatives coming within the true scope and spirit of the invention as embodied in the attached claims. Applicant reserves the right to submit claims directed to combinations and sub-combinations of the disclosed inventions that are believed to be novel and non-obvious. Inventions embodied in other combinations and sub-combinations of features, functions, elements and/or properties may be claimed through amendment of those claims or presentation of new claims in the present application or in a related application. Such amended or new claims, whether they are directed to the same invention or a different invention and whether they are different, broader, narrower or equal in scope to the original claims, are to be considered within the subject matter of the inventions described herein.

What is claimed is:

1. A fishing jig, comprising:
   a semitransparent skirt having:
      a generally tubular body that extends along a longitudinal axis between a closed head end and a tail end, the tubular body including:
         an opening positioned on a top portion of the tubular body, the opening extending from a proximal end on the top portion to a distal end at a tip at the rearmost portion of the tubular body, the tip positioned on a bottom portion of the tubular body,
         a taper extending along the length of the opening from a taper start point on the top portion of the tubular body to the tip, and
         a slit extending from a slit stop point on the bottom portion of the tubular body to the tip, the slit positioned on the bottom portion of the tubular body that splits the tail end into two split tail portions,
         wherein the distance between the taper start point and the closed head end is shorter than the distance between the slit stop point and the closed head end,
         wherein the distance between the proximal end of the opening and the closed head end is shorter than the distance between the slit stop point and the closed head end,
         wherein the opening, the taper, and the slit meet at the tip of the tubular body, and
      a channel formed within the tubular body that extends along the longitudinal axis from the opening through the tubular body at least partway toward the head end; and
      a jig head positioned within the channel and proximal to the head end, the jig head including a hook that extends from the tubular body and through the opening.

2. The jig of claim 1, wherein the slit extends from the tip to the slit stop point, and wherein the slit stop point is positioned in a plane normal to the longitudinal axis that is between a plane normal to the longitudinal axis containing the tip and a plane normal to the longitudinal axis containing the taper start point.

3. The jig of claim 1, wherein the taper start point is positioned on the top of the tubular body at approximately a midpoint of the skirt measured along a length of the skirt.

4. The jig of claim 3, wherein the slit extends from the tip to the slit stop point, and wherein the slit stop point is located at approximately a midpoint between the taper start point and the tip, measured along the length of the skirt.

5. The jig of claim 1, wherein a body of the jig head includes patterning formed thereon that mimics the appearance of a bait fish, and wherein the patterning is visible through the skirt.

6. The jig of claim 1, wherein a body of the jig head is coated with an ultraviolet reflective coating.

7. The jig of claim 1, wherein the head end of the skirt further comprises a pointed nose, and wherein the pointed nose is at least partially formed by an angled substantially flat portion that extends from a tip of the pointed nose toward the bottom portion of the tubular body of the skirt and a convex curved surface that extends from the top of the tubular body of the skirt to the tip of the pointed nose.

8. The jig of claim 7, wherein the pointed nose points slightly downward with respect to the longitudinal axis of the skirt.

9. The fishing jig of claim 1, wherein the jig head further comprises:
   a body having a first side and a second side; and
   an eye positioned on each of the first side and the second side, the eyes being visible through the skirt.

10. A fishing jig system, comprising:
    a semitransparent skirt having:
       a generally tubular body that extends along a longitudinal axis between a closed head end and a tail end, the tubular body including:
       an opening positioned on a top portion of the tubular body, the opening extending from a proximal end on the top portion to a distal end at a tip at the rearmost portion of the tubular body, the tip positioned on a bottom portion of the tubular body,
       a taper extending along the length of the opening from a taper start point on the top portion of the tubular body to the tip, and
       a slit extending from a slit stop point on the bottom portion of the tubular body to the tip, the slit positioned on the bottom portion of the tubular body that splits the tail end into two split tail portions,
       wherein the distance between the taper start point and the closed head end is shorter than the distance between the slit stop point and the closed head end,
       wherein the distance between the proximal end of the opening and the closed head end is shorter than the distance between the slit stop point and the closed head end,
       wherein the opening, the taper, and the slit meet at the tip of the tubular body; and
    a channel formed within the tubular body that extends from the opening along the longitudinal axis from the opening through the tubular body at least partway toward the head end;
    wherein the skirt is configured to receive a jig head including eyes within the channel such that the eyes are visible through the semitransparent skirt.

11. The system of claim 10, wherein the head end of the skirt further comprises a pointed nose, and wherein the pointed nose is at least partially formed by an angled substantially flat portion that extends from a tip of the pointed nose toward the bottom portion of the tubular body of the skirt and a convex curved surface that extends from the top of the tubular body of the skirt to the tip of the pointed nose.

12. The system of claim 10, further comprising the jig head, and wherein the jig head comprises:
    a body having a first side and a second side,
    the eyes positioned on each of the first side and the second side; and
    a hook that extends from the body;
    wherein the body includes patterning that mimics the appearance of a bait fish and is coated with an ultraviolet reflective coating.

* * * * *